(12) United States Patent
Graham

(10) Patent No.: US 7,337,024 B1
(45) Date of Patent: Feb. 26, 2008

(54) FLAT PANEL DISPLAY CONCEALMENT AND VIEWING APPARATUS AND METHOD

(76) Inventor: Jonathan W. Graham, 1020 SE. 11th St., Fort Lauderdale, FL (US) 33316

( * ) Notice: Subject to any disclaimer, the term of this patent is extended or adjusted under 35 U.S.C. 154(b) by 131 days.

(21) Appl. No.: 11/446,425

(22) Filed: Jun. 2, 2006

(51) Int. Cl.
| | |
|---|---|
| G05B 9/02 | (2006.01) |
| G06F 1/16 | (2006.01) |
| A47H 1/00 | (2006.01) |
| A47G 5/02 | (2006.01) |
| A47B 88/00 | (2006.01) |
| E06B 9/15 | (2006.01) |
| H05K 5/00 | (2006.01) |

(52) U.S. Cl. .......................... 700/79; 160/31; 160/85; 160/239; 312/295; 312/297; 312/310; 345/905; 361/681

(58) Field of Classification Search .................. 700/79; 160/31, 85, 239; 312/295, 297, 310; 345/905; 361/681
See application file for complete search history.

(56) References Cited

U.S. PATENT DOCUMENTS

| | | | | |
|---|---|---|---|---|
| 5,138,462 | A * | 8/1992 | Skovgaard | 348/836 |
| 6,366,451 | B1 * | 4/2002 | Smock et al. | 361/681 |
| 6,402,109 | B1 * | 6/2002 | Dittmer | 248/284.1 |
| 6,601,811 | B1 * | 8/2003 | Van Lieshout | 248/282.1 |
| 6,633,276 | B1 * | 10/2003 | Jaynes | 345/158 |
| 6,752,363 | B2 * | 6/2004 | Boele | 248/183.1 |
| 6,901,987 | B1 * | 6/2005 | Graham | 160/121.1 |
| 2005/0168661 | A1 * | 8/2005 | Maxson | 348/825 |
| 2006/0076860 | A1 * | 4/2006 | Hoss | 312/312 |
| 2006/0150462 | A1 * | 7/2006 | Rossi | 40/700 |
| 2006/0176655 | A1 * | 8/2006 | Hillman et al. | 361/683 |

* cited by examiner

Primary Examiner—Ronald D Hartman, Jr.
(74) Attorney, Agent, or Firm—Dan Brown Law Office; Daniel R. Brown

(57) ABSTRACT

An apparatus for concealing a display of the flat panel type, and for supporting and extending the display to a viewing position. The apparatus includes a display cover that operates between a concealed position and a revealed position, and a display support that operates between a retracted position and an extended position. There is also a display support interlock that is coupled to disable operation of the display support when the display cover moves away from the revealed position, and a display cover interlock that is coupled to disable operation of the display cover when the display support moves away from the retracted position. A controller with a wireless remote is coupled to the components of the apparatus to enable remote operation thereof. A housing with decorative frame surrounds the flat panel display and presents a display opening. The display cover may be a fabric sheet that is furled from a motor driven roller within the display opening. A robotic arm may serve as the display support, which tilts, swivels, and rotates the flat panel display to an optimum viewing position.

24 Claims, 9 Drawing Sheets

FLAT PANEL DISPLAY CONCEALMENT AND VIEWING APPARATUS AND METHOD

BACKGROUND OF THE INVENTION

1. Field of the Invention

The present invention relates to concealment coverings for flat panel displays. More specifically, the present invention relates to decorative coverings that conceal and reveal a flat panel display, which are extendably supported to enable optimized viewing position placement of the flat panel display.

2. Description of the Related Art

People invest a significant amount of effort and money in decorating their homes in a particular style, including furniture, artwork, wall coverings, fixtures, and so forth. Some businesses and retail stores similarly invest in a particular décor that meets the needs or desires of their owners and customers. The modern trend toward flat panel displays for video, television, computers, and other display applications is placing such devices in homes, offices and businesses with ever increasing frequency. When these displays are not in use, they can conflict with the desired décor, and it has been necessary to disguise or conceal them in some fashion, or endure an item that is unappealing as compared to the general décor of a room or space. U.S. Pat. No. 6,901,987 to Graham for Furled Decorative Covering Apparatus and Method ('987 patent) teaches a solution to the need in the art to conceal such as display. The '987 patent was invented, filed and issued to the inventor of the present invention, the contents of which are hereby incorporated by reference thereto.

While the '987 patent addresses the issue of decoratively covering an unsightly flat panel display, it leaves another issue unresolved. There is also a conflict between positioning the display and decorative cover for optimum viewing purposes or for optimum decorative purposes. The best position for viewing the flat panel display is frequently different from the best position for decorating a room. In some cases, the physical room layout may not even include a wall surface that is optimum for flat panel display viewing. Thus, there is a need in the art for an apparatus and method for providing a decorative covering for a flat panel display that not only conceals and reveals the flat panel display, but also enables flexible positioning thereof and a means for optimizing the view angle of the flat panel display.

SUMMARY OF THE INVENTION

The need in the art is addressed by the apparatus methods of the present invention. An apparatus for concealing a display of the flat panel type, and for supporting and extending the display to a viewing position is taught. The apparatus includes a display cover that operates between a concealed position and a revealed position, and a display support that operates between a retracted position and an extended position. There is also a display support interlock that is coupled to disable operation of the display support when the display cover moves away from the revealed position.

In a specific embodiment of the invention, the apparatus further includes a display cover interlock that is coupled to disable operation of the display cover when the display support moves away from the retracted position. In a particular embodiment, the display support interlock is a switch that is actuated by the display cover when the revealed position is reached, and the display cover interlock is a switch that is actuated by the display support when the retracted position is reached.

In a specific embodiment of the invention the display cover includes a first control interface and the display support includes a second control interface. A controller is coupled to the first control interface and the second control interface, and is also coupled to the display support interlock and the display cover interlock. In operation, the controller operates to drive the display cover between the revealed position and the concealed position, and also operates to drive the display support between the retracted position and the extended position. The controller enables the interlock operation of the display cover and the display support in response to actuations of the first and second interlock switches. In a refinement to this embodiment, a remote controller is added that wirelessly communicates with the controller for enabling operation thereof.

In a specific embodiment of the invention, the display cover is a flexible sheet that is furled and unfurled from a roller to facilitate the transition between the concealed position and the revealed position. The flexible sheet may be a fabric having a decorative surface that is exposed when in the concealed position. In a refinement to the invention, the display cover is motor driven between the concealed position and the revealed position. In a specific embodiment, is a Lutron QED series motor driven roller.

In a specific embodiment of the invention, the foregoing apparatus further includes a housing disposed about the display support that has a display opening formed therein. The display cover substantially covers the display opening when at the concealed position, and the display support extends the display through the display opening when at the extended position. In a refinement to this embodiment, a decorative frame disposed about the display opening.

In a specific embodiment of the invention, the display support extends outwardly from a vertical mounting surface. The mounting surface may be a wall. In another specific embodiment, the display support tilts and swivels at the extended position, thereby enabling optimization of the display position for viewing. In another embodiment, the display support rotates the display through ninety degrees at the extended position between a portrait orientation and a landscape orientation. In a specific embodiment, the display support is a robotic arm. The robotic arm may be a CLO Systems, L.L.C. X-Arm model robotic arm.

The present invention teaches a method of concealing a display of the flat panel type with a display cover, drivable between a concealed position and a revealed position, and for supporting the display with a display support that is extendable from a retracted position to an extended position for viewing. The method includes the steps of interlocking against operation of the display support if the display cover is away from the revealed position, and driving the display cover to the revealed position. Also, enabling operation of the display support when the display cover reaches the revealed position, and extending the display support.

In a specific embodiment, the method further includes interlocking against operation of the display cover when the display support moves away from the retracted position, and retracting the display support. Also, enabling operation of the display cover when the display support reaches the retracted position, and driving the display cover to the concealed position.

In a specific embodiment of the method, where the display cover is a flexible sheet wrapped about a roller, the method includes the further steps of unfurling the sheet from the roller to position the display cover in the concealed position, and furling the sheet onto the roller to position the display cover in the revealed position. In a refinement to the method, where the display cover is motor driven, the further step of driving the display cover to the revealed position using the motor is added.

In a specific embodiment of the invention, where the display cover and the display support are coupled to a controller, and where the controller is coupled to a display support interlock switch that is actuated by the display cover when the revealed position is reached, and coupled to a display cover interlock switch that is actuated by the display support when the retracted position is reached, the method adds further steps. The added steps include driving the display cover, by the controller, between the revealed position and the concealed position, and driving the display support, by the controller, between the retracted position and the extended position. Also added are the steps of interlocking the operation of the display cover and the display support in response to actuation of the display cover interlock switch and the display support interlock switch. In a refinement to the foregoing, the step of remotely controlling the controller using a wirelessly communicative remote control is added.

In a specific embodiment of the invention, the method includes the further step of extending the display support outwardly from a vertical mounting surface. In a refinement to the foregoing, the method includes the further steps of tilting the display by the display support at the extended position, and swiveling the display by the display support at the extended position, thereby optimizing the display position for viewing. In another refinement, the method includes the further step of rotating the display through ninety degrees by the display support at the extended position, between a portrait orientation and a landscape orientation.

DESCRIPTION OF THE INVENTION

Figure 1:
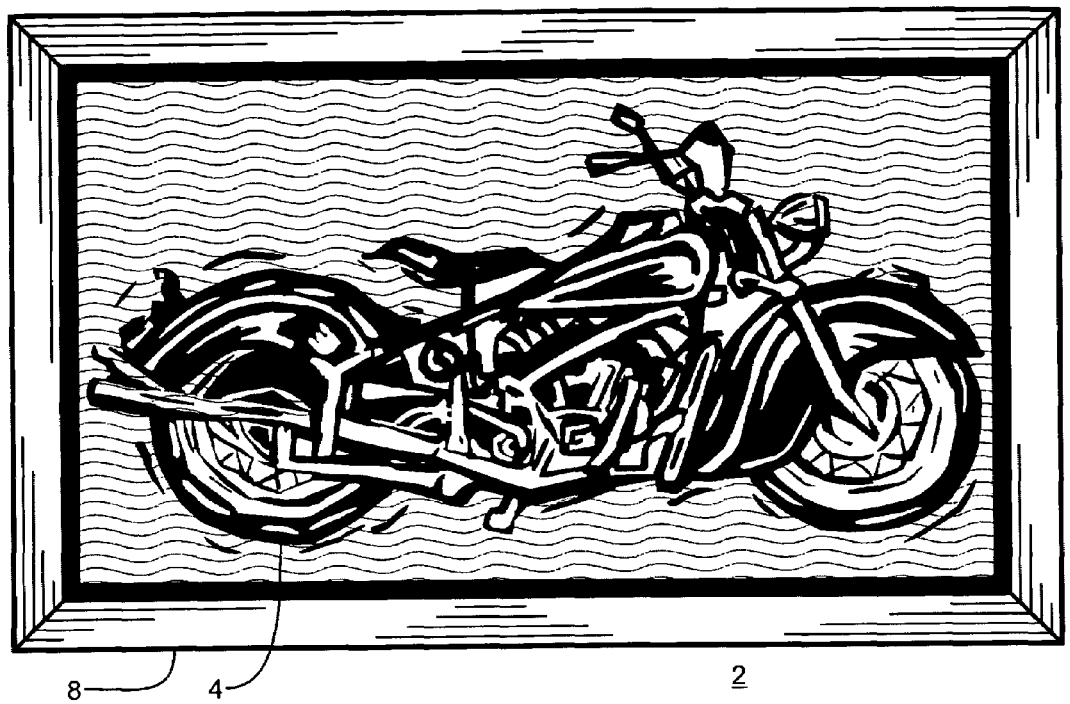
FIG. 1 is a front view drawing of a flat panel display concealment and viewing apparatus showing the flat panel display concealed behind a cover according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The present invention overcomes the problems in the prior art through integrated combination of a means for concealing and revealing a flat panel display with a means for retracting and extending a flat panel display. The means for concealing and revealing can be decorated to suit the stylistic and décor requirement of each discrete user. In an illustrative embodiment, a housing with decorator picture frame and a retractable canvas cover having an art piece imprinted thereon is employed. When concealed, the flat panel display is retracted into the housing and concealed with the flexible canvas artwork piece. When the user desires to view the flat panel display, the canvas cover is retracted to expose a display opening in the housing. The flat panel display viewing position is enhanced by extending the display through the display opening, using the means for retracting and extending the flat panel display. In various embodiments, the display can be tilted, swiveled and rotated to an optimum viewing orientation by the means for retracting and extending the flat panel display. A means for detecting the revealed position of the means for concealing and revealing a flat panel display interlocks operation of the means for retracting and extending a flat panel display, which prevents the display from being extended when concealed. In another illustrative embodiment, a means for detecting the retracted position of the means for retracting and extending a flat panel display interlocks operation of the means for concealing and revealing a flat panel display, which prevents the display from being concealed while extended. These interlock functions ensure smooth and reliable operation of the apparatus without any potential for a collision. Remote operation is enabled by using a programmable controller with a wireless remote controller. The programmable controller may be any type that is known to those skilled in the art to be suitable for operation of the means employed. Operation is simplified in an illustrative embodiment by enabling a simple on-and-off actuator to both energize the flat panel display and operate the combined means discussed above. In the case where the flat panel display is a television receiver, the user merely presses a button to turn on the TV, which causes the TV to power-up, the artwork to be opened to reveal the TV, and the TV to be extended to a predetermined optimum viewing position. When an off button is pressed, the converse functions are executed. It should be noted that while a flexible cover is employed in the several illustrative embodiments, any covering means that can be moved between a concealed position and a revealed position, with respect to the flat panel display, would be equally applicable to the teachings of the present invention.

Reference is directed to FIG. 1, which is a front view drawing of a flat panel display concealment and viewing apparatus 2 showing the flat panel display concealed behind a cover according to an illustrative embodiment of the present invention. In this figure, the flat panel display is not visible because it is concealed behind a canvas cover 4 that has an artistic image imprinted thereon. The decorative concealment effect is completed by surrounding the artwork 4 with a designer picture frame 8. Thus, when concealed, the apparatus appears to be a picture hanging on a wall, the style of which may be adapted to the user's desired décor.

Figure 2:
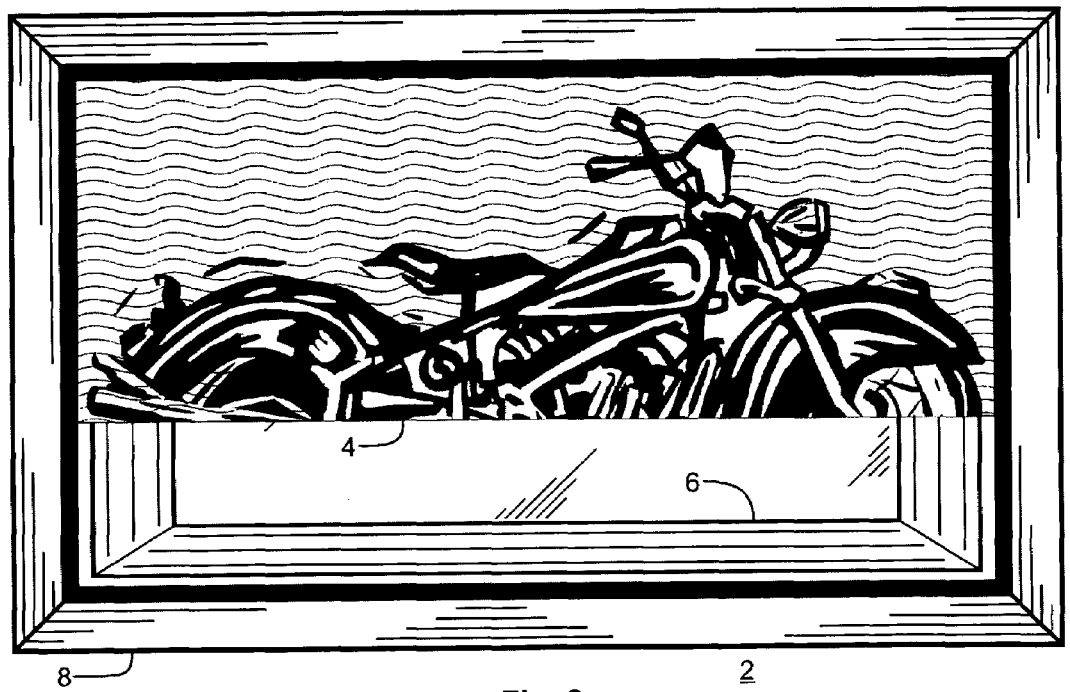
FIG. 2 is a front view drawing of a flat panel display concealment and viewing apparatus showing the cover transitioning to reveal the flat panel display according to an illustrative embodiment of the present invention.

Reference is directed to FIG. 2, which is a front view drawing of the flat panel display concealment and viewing apparatus 2 showing the cover transitioning to reveal the flat panel display according to an illustrative embodiment of the present invention. The illustrative embodiment uses a unique draping canvas artwork system that provides a smooth and visually pleasing transition from the concealed position to the revealed position. The artistic image 4 does not move up or down as would be expected in a window-shade style roller systems, but rather is furled internally from the bottom of the image. As the artwork 4 is furled away, the flat panel display television 6 underneath is gracefully revealed within the designer picture frame 8. The revealing action first exposes the flat panel display at the bottom of the frame 8 opening and traverses upwardly until the entire display 6 is revealed.

Figure 3:
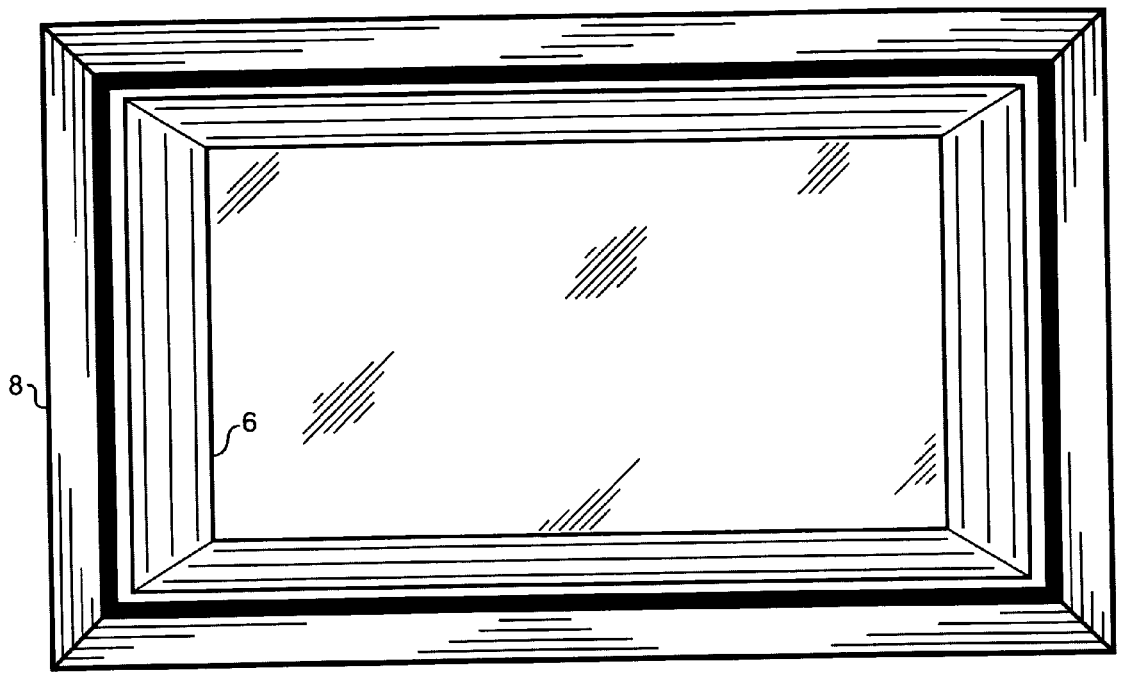
FIG. 3 is a front view drawing of a flat panel display concealment and viewing apparatus showing the cover open to reveal the flat panel display according to an illustrative embodiment of the present invention.

Reference is directed to FIG. 3, which is a front view drawing of a flat panel display concealment and viewing apparatus 2 showing the cover open to reveal the flat panel display according to an illustrative embodiment of the present invention. Once the decorative canvas cover (not shown in this figure) has fully traversed to the revealed position, the full flat panel display 6 is plainly visible within the display opening of the decorative picture frame 8. This simple frontal view leaves the impression that the flat panel display would be plainly visible and ready for viewing as well, however the position within a room environment and the arrangement of the room for viewing access does not always comport with this impression. In particular, a flat panel display that is mounted at picture height is frequently subjected to reflection of room and ceiling light fixtures in such a manner as to cause distracting glare on the display 6 surface. The teachings of present invention enable the user to overcome this problem in the prior art by tilting and swiveling the flat panel display so as to improve the viewing angle and to eliminate distracting reflections from the viewing surface.

Figure 4:
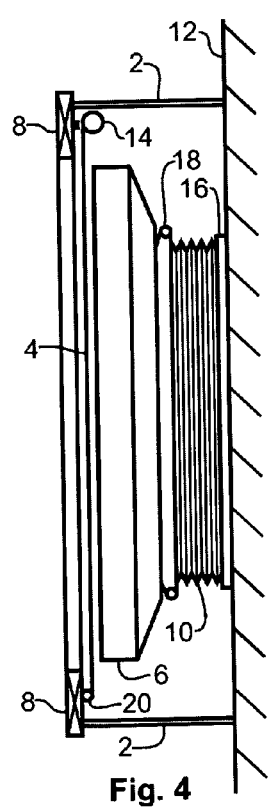
FIG. 4 is a side sectional view drawing of a flat panel display concealment and viewing apparatus showing the cover closed to conceal the flat panel display according to an illustrative embodiment of the present invention.
Figure 5:
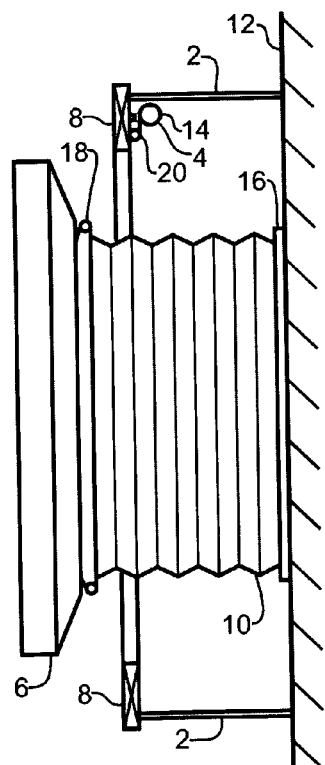
FIG. 5 is a side sectional view drawing of a flat panel display concealment and viewing apparatus showing the cover open and the flat panel display extended for viewing according to an illustrative embodiment of the present invention.
Figure 6:
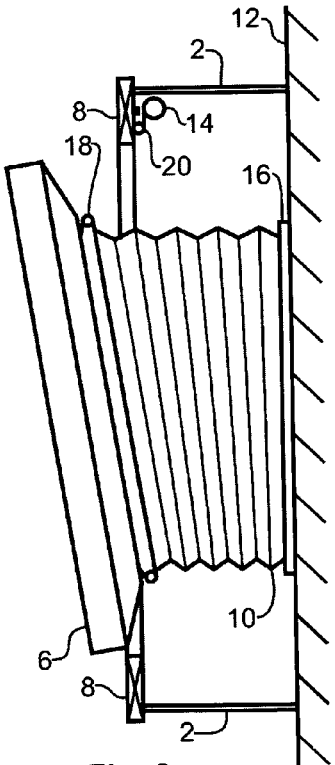
FIG. 6 is a side sectional view drawing of a flat panel display concealment and viewing apparatus showing the cover open and the flat panel display extended for viewing according to an illustrative embodiment of the present invention.

Reference is directed to FIG. 4, FIG. 5, and FIG. 6, which are side sectional view drawings of the flat panel display concealment and viewing apparatus 2 showing the transition from the concealed and retracted position of the apparatus 2 to the revealed, extended, and tilted position according to an illustrative embodiment of the present invention. Structurally, the apparatus in these figures includes a support housing 2 with the designer frame 8 attached to the front thereof. The flat panel display 6 is supported by a display support 10 that is operable between a retracted position, shown in FIG. 4, to an extended position, shown in FIG. 5. The display support 10 includes a wall mount adapter 16 and a display mount adapter 18. The wall mount adapter 16 can be attached directly to the wall 12 on which the apparatus 2 is mounted, or may be mounted to a rear enclosure surface of the apparatus housing 2. The connection between the flat panel display 6 and the display mount adapter 18 is accomplished using holes, slotted holes, and threaded fasteners, as are known to those skilled in the art. The flexible display cover 4 is furled and unfurled from roller 14, which causes the cover 4 to reveal and conceal the display opening within the decorator frame 8. The unique draping action of the illustrative embodiment is realized by draping the cover 4 around secondary roller 20 such that the cover 4 extends downwardly from roller 14, around secondary roller 20, and then upwardly to an attachment point on the upper portion of the housing 2. In operation, the rotating action of roller 14 causes the secondary roller 20 to traverse upwardly and downwardly as the cover 4 is furled and unfurled.

In FIG. 4, the display support is fully retracted and the display 6 is held within the housing 2 and behind the cover 4, which is in the concealed position. In the concealed position, the cover 4 drapes down and around secondary roller 20, which is supported by the cover 4 near the bottom portion of the housing 2. In FIG. 5, the cover 4 has been furled onto roller 14, which has caused secondary roller 20 to traverse all the way to the top portion of display housing 2, thereby revealing the display 6 through the display opening in decorator frame 8. The cover 4, the roller 14, and the secondary roller 20 are all hidden behind the decorator frame 8 when the cover is at the revealed position. In FIG. 5, the display support 10 has been extended to cause the display 6 to protrude through the decorator frame 8 into the open area in front of the housing 2. FIG. 6 illustrates that the display support 10 has be tilted downwardly, thereby tilting the flat panel display 6 downwardly as well. As noted herein before, this positioning minimizes reflective glare and orients the display to the line of sight of viewers seated in the viewing environment. It should also be noted that the housing 2 can be recessed into the wall to which it is connected such that the decorator frame 8 is flush with the wall surface.

Figure 7:
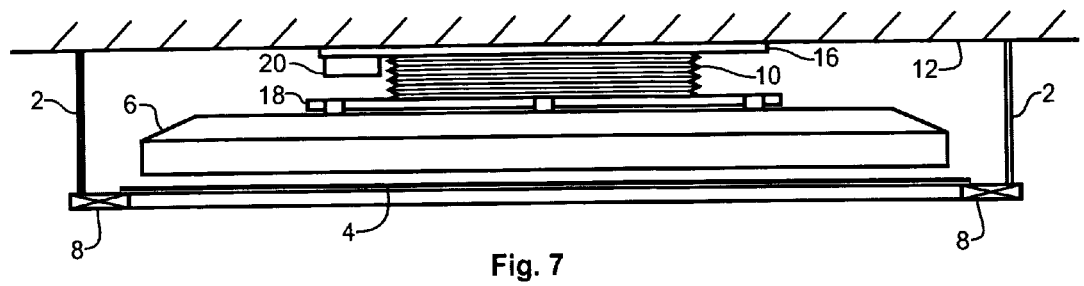
FIG. 7 is a top sectional view drawing of a flat panel display concealment and viewing apparatus showing the cover closed to conceal the flat panel display according to an illustrative embodiment of the present invention.
Figure 8:
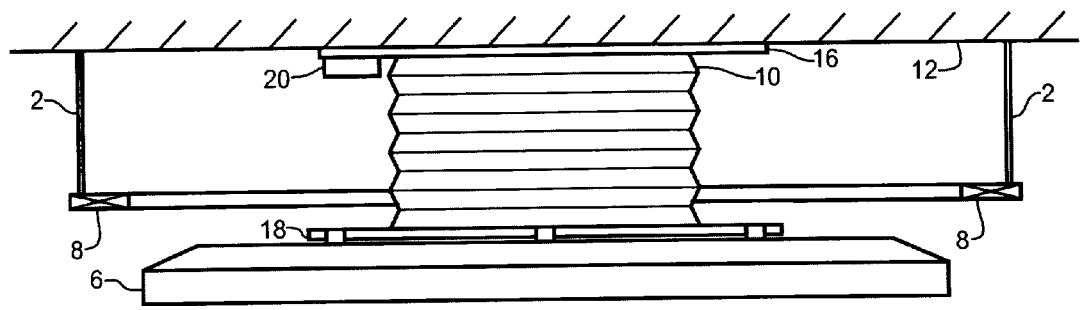
FIG. 8 is a top sectional view drawing of a flat panel display concealment and viewing apparatus showing the cover open and the flat panel display extended for viewing according to an illustrative embodiment of the present invention.
Figure 9:
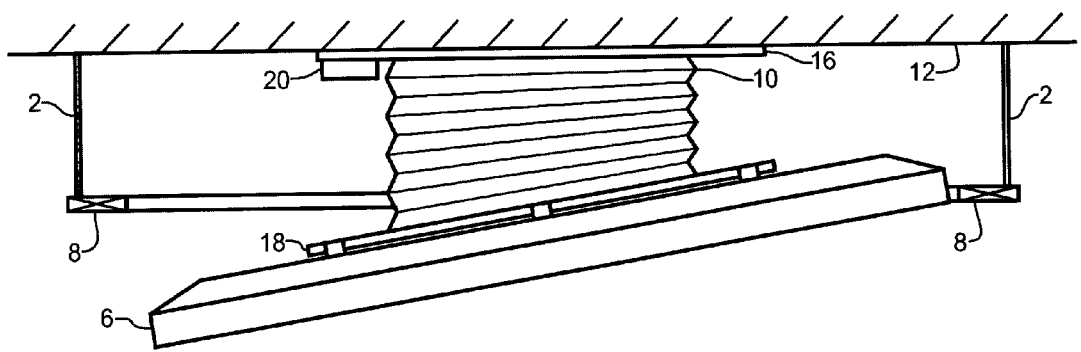
FIG. 9 is a top sectional view drawing of a flat panel display concealment and viewing apparatus showing the cover open and the flat panel display extended for viewing according to an illustrative embodiment of the present invention.

Reference is directed to FIG. 7, FIG. 8, and FIG. 9, which are top sectional view drawings of the flat panel display concealment and viewing apparatus 2 showing the transition from the concealed and retracted position of the apparatus 2 to the revealed, extended, and swiveled position according to an illustrative embodiment of the present invention. The apparatus in these figures includes the support housing 2 with the designer frame 8 attached to the front thereof. The flat panel display 6 is supported by the display support 10 that is operable between a retracted position, shown in FIG. 7, to an extended position, shown in FIG. 8. The display support 10 includes a wall mount adapter 16 and a display mount adapter 18. The wall mount adapter 16 can be attached directly to the wall 12 on which the apparatus 2 is mounted, or may be mounted to a rear enclosure surface of the apparatus 2. The connection between the flat panel display 6 and the display mount adapter 18 is accomplished using holes, slotted holes, and threaded fasteners, as are known to those skilled in the art. The flexible display cover 4 is visible in FIG. 7, where it is in the concealed position. However the cover 4 is not visible in FIG. 8 and FIG. 9 because the section view is taken below the location of the cover while it is in the revealed position.

In FIG. 7, the display support 10 is fully retracted and the display 6 is held within the housing 2 and behind the cover 4, which is in the concealed position. In the concealed position, the cover 4 obscures the view of the flat panel display 6 from the outside of the housing 2. In FIG. 8, the cover 4 has been furled to the revealed position, and is therefore not visible within the display opening of decorator frame 8. Also in FIG. 8, the display support 10 has been extended to cause the display 6 to protrude through the decorator frame 8 into the open area in front of the housing 2. FIG. 9 illustrates that the display support 10 has be swiveled to the side, thereby swiveling the flat panel display 6 as well. The aforementioned tilting action can be combined with the swiveling action. The swiveled position enables the user to orient the viewing angle toward viewers who would not otherwise be optimally aligned because of misalignment of the viewing area seating with the display and housing location. Thus, the tilting and swiveling actions enable articulation of the display toward a far greater range of locations in any given room, while still allowing optimal view angles to be achieved, and while still enabling the user to conceal the flat panel display in a decorator enclosure while not in use. As can be envisioned by the foregoing, there exists a problem of potential collision between the cover 4, the display 6, and the display support 10 during the transitions between the fully concealed position and the fully revealed, extended, and articulated positions. While the careful user may be able to manually operate such a system to avoid such collisions, that approach is cumbersome and ultimately prone to failure, and is not convenient for the user to operate. The following discussion will enlighten the reader as to how further embodiments of the present invention address this dilemma.

Figure 10:
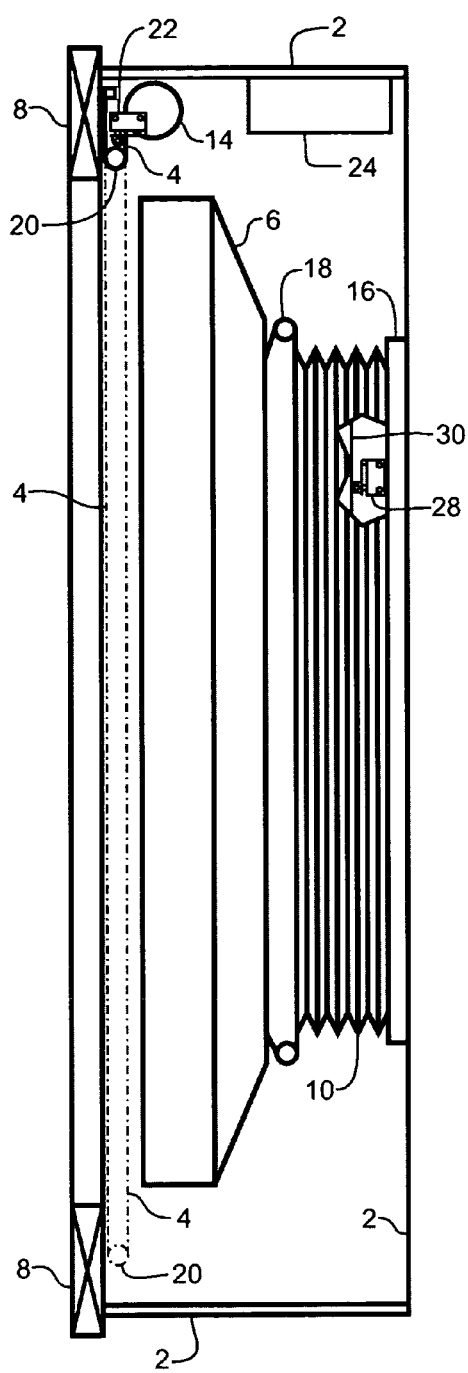
FIG. 10 is a side sectional view drawing of a flat panel display concealment and viewing apparatus showing the cover open and the flat panel display retracted according to an illustrative embodiment of the present invention.

Reference is directed to FIG. 10, which is a side sectional view drawing of a flat panel display concealment and viewing apparatus showing the cover open to the revealed position and the flat panel display retracted according to an illustrative embodiment of the present invention. The illustration in FIG. 10 generally conforms to the foregoing embodiment, adding further details to certain interlock means used to coordinate operation of the extendable display support 10 and the display cover 4. As mentioned above, an interlock to the operation of the display support extension operation is provided. The interlock in the illustrative embodiment is a switch 22 that is actuated by the secondary roller 20 when it reaches is upward travel limit at the fully revealed position. When the switch 22 is actuated, there is positive, mechanical and physical, confirmation that the cover has fully traversed the frame 8 opening, and that the display opening in the frame 8 is clear for extension of the display. When the switch 22 is not actuated, the operation of the display support 10 is interlocked against operation of any kind. In the illustrative embodiment, the switch 22 engages the secondary roller 20, however any suitable arrangement for physically detecting that the cover is in the fully revealed position may be utilized, as will be appreciated by those skilled in the art.

Also illustrated in FIG. 10 is the use of a display cover interlock switch 28. The cover interlock switch 28 engages a frame member 30 within the display support only when the display support is in the fully retracted position. In this way, actuation of the switch 28 is mechanical and physical confirmation that the display 6 and display support 10 are in the fully retracted position. If the cover interlock switch 28 is not actuated, then the display cover 4 is interlocked against any operation. Note that the cover 4 is actually interlocked by preventing the cover roller 14 from rotating. In the illustrative embodiment, the display cover roller 14 is a motorized roller that can be driven in both rotational directions to furl and unfurl the display cover 4 between the concealed and revealed positions, as described herein before. Similarly, the display support is motorized to drive the display 6 between the retracted and extended positions, and to the tilt and swivel position as well. Operation of the display cover 4 and the display support 10 is achieved using a controller 24, which is located at a discreet position within the housing 2.

Figure 11:
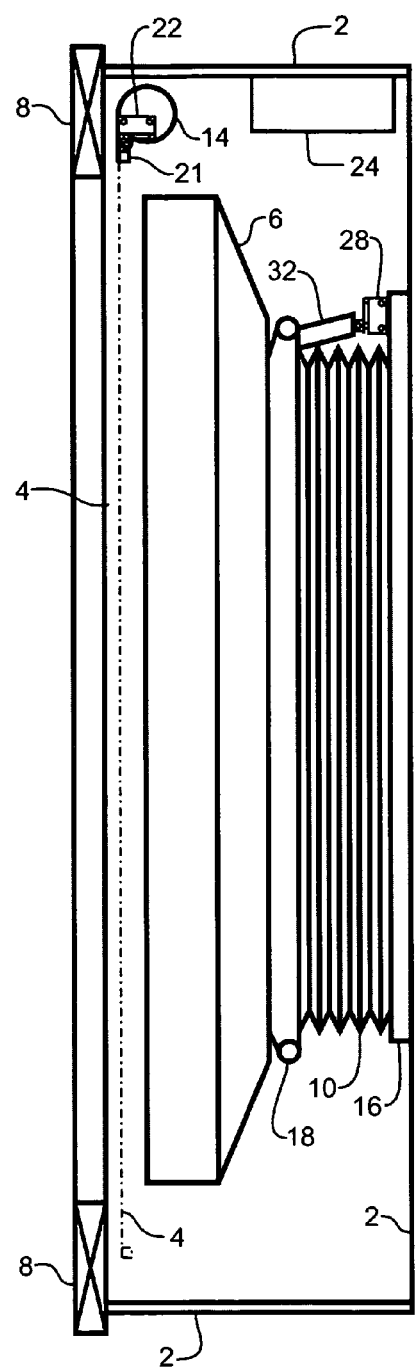
FIG. 11 is a side sectional view drawing of a flat panel display concealment and viewing apparatus showing the cover open and the flat panel display retracted according to an illustrative embodiment of the present invention.

Reference is directed to FIG. 11, which is a side sectional view drawing of a flat panel display concealment and viewing apparatus showing the cover open and the flat panel display retracted according to an alternative illustrative embodiment of the present invention. The housing 2, the decorator frame 8, flat panel display 6, and display support 10 and components are generally configured in a similar manner to those described herein before. In FIG. 11, a conventional window shade roller 14 mechanism is used to drive the display cover 4 between the concealed and revealed positions. A weighted bar 21 is attached to the lower end of the display cover 4, so as to hold the cover 4 in a taught condition, thereby flattening the cover surface when in the concealed, or closed, position. In this embodiment, the display support interlock switch 22 engages the bar 21 when the cover is at the fully revealed position. The display cover interlock switch 28 is also configured in an alternative different manner in FIG. 11. The switch 28 is mounted to the wall mount portion 16 and engages an extension member 32 that is rigidly connected to the display mount 18. This embodiment is useful in applications where there is no space within the display mount to position the switch, or in certain retrofit applications. Those skilled in the art will appreciate that the interlock means and positions are merely exemplary and that an endless variety of devices and configurations could be implemented. The function intended is to detect when the cover is fully retracted, thereby clearing the way for the extension of the display, and also to detect when the display is fully retracted, thereby clearing the way for concealment by the cover. The more generalized arrangement follows and is described with respect to FIG. 12.

Figure 12:
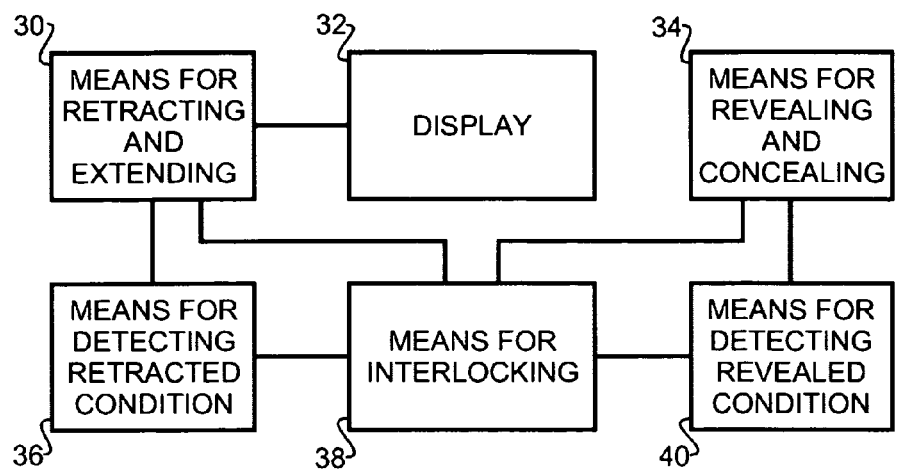
FIG. 12 is a functional block diagram of a flat panel display concealment and viewing apparatus according to an illustrative embodiment of the present invention.

Reference is now directed to FIG. 12, which is a functional block diagram of a flat panel display concealment and viewing apparatus according to an illustrative embodiment of the present invention. The flat panel display 32 is extendably supported by a means for retracting and extending 30 the display. A means for revealing and concealing the display 34 is positioned relative to the display 32 to achieve the stated function. A means for detecting the revealed condition 40, or position, of the display cover 40 is engaged to make such a determination. Similarly, a means for detecting the retracted condition 36, or position, of the display is engaged to make such a determination. Both means 36, 40, are coupled to an interlocking means 38, which prevents the interlocked means from operating when the required condition of position is not satisfied. Now continuing with the description of the foregoing illustrative embodiment, consider FIG. 13.

Figure 13:
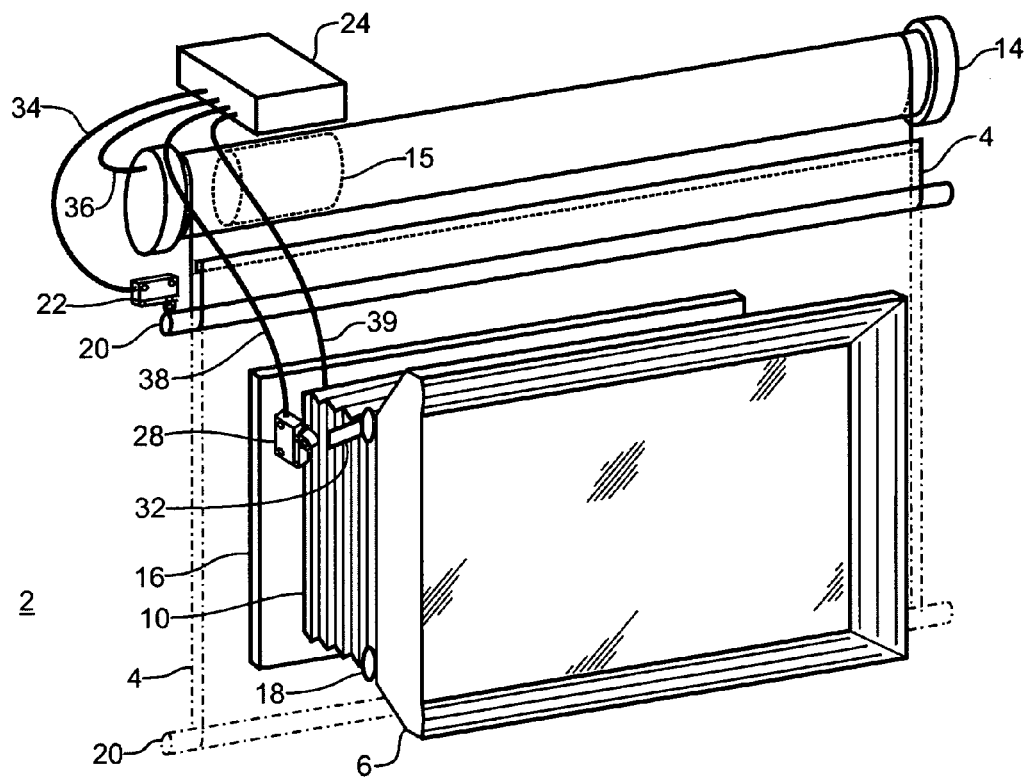
FIG. 13 is an isometric view of a flat panel display concealment and viewing apparatus according to an illustrative embodiment of the present invention.

Reference is directed to FIG. 13, which is an isometric view of a flat panel display concealment and viewing apparatus 2 according to an illustrative embodiment of the present invention. The various components are illustrated, with the interconnection and operation also shown. The cover roller 14 is driven by an internal electric motor 15, which enables rotation in both directions to facilitate furling and unfurling the decorated canvas cover 4. The secondary roller 20 is supported by the cover 4, and traverses upwardly and downwardly as the cover is furled and unfurled, respectively, from the roller 14, which enables transition from the concealed to revealed positions. When the cover 4 reaches the fully revealed position, the secondary roller 20 engages the display support interlock switch 22. The display support 10 is hung from a wall (not illustrated) by the wall bracket 16, and is connected to the display 6 with a display bracket 18. A display bracket extension 32 engages the display cover interlock switch 28 when the display support is in the fully retracted position.

The interrelation of operation of the components in FIG. 13 is managed by a programmable controller 24, which may be any suitable programmable controller know to those skilled in the art to be useful. The programmable controller 24 is electrically coupled to the motor driven roller 14 by cable 36. The programmable controller 24 is electrically coupled to the extendable display support 10 by cable 39. The programmable controller 24 is electrically coupled to the display support interlock switch 22 by cable 34. The programmable controller 24 is electrically coupled to the display cover interlock switch 28 by cable 38. Thus, the programmable controller receives stimuli from the interlock switches 22, 28, and causes the interlock of the display support 10 extension and the cover 4 operation as described hereinbefore. The programmable controller 24 also communicates with the roller 14 drive and the cover support via serial communications, which provides a data path for software control of the device's operation, position, and status. The interlock switches 22, 28 provide a positive, physical, confirmation of the revealed and retracted positions.

Figure 14:
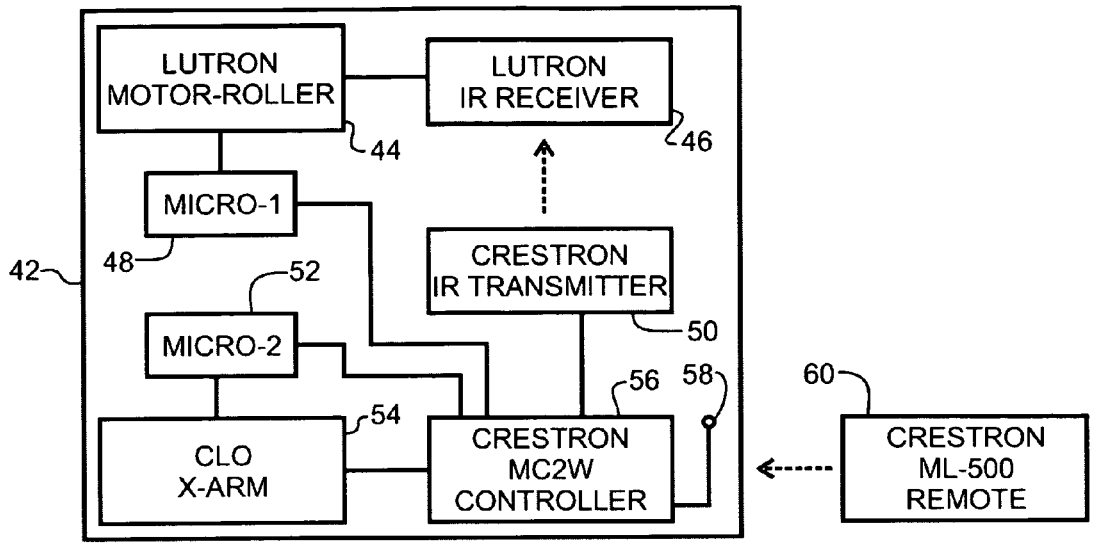
FIG. 14 is a functional block diagram of a flat panel display concealment and viewing apparatus according to an illustrative embodiment of the present invention.

Reference is directed to FIG. 14, which is a functional block diagram of a flat panel display concealment and viewing apparatus 42 according to an illustrative embodiment of the present invention. The illustrative embodiment illustrates a configuration of the present invention based on commercially available components. The motorized roller 44 is a Lutron Sivoia QED series roller, model "EDU 100", which is available from Lutron Electronics Company, Inc., Cooperstown, Pa. The display support 54 is a CLO X-Arm robotic arm, which is available from CLO Systems, L.L.C., West Covina, Calif. The programmable controller 56 is a Crestron model MC2W control system with integrated RF gateway, which is available from Crestron Electronics, Inc., Rockleigh, N.J. Communications between the CLO X-Arm 54 and the Crestron controller 56 is accomplished using and cable and a pair of RS-232 serial communication ports, which are incorporated into the respective devices. Communication between the Lutron motor roller 44 and the Crestron controller 56 is accomplished wirelessly using a Lutron model "SV-IR" infrared receiver 46 and a Crestron infrared transmitter 50, which is Crestron model number "IRP2" Infrared Emitter Probe. The interlock switches 48, 52, are SPST "Micro" switches of suitable configuration for mounting and engagement as described hereinbefore, and as are known to those skilled in the art. Remote operation of the controller 56 is accomplished using a Crestron model "ML-500" RF remote controller 60 that communicates with an antenna 58 that is coupled to the controller 56. The functional operation of the controller 56 is achieved through custom programming using the native programming language of the Crestron controller 56.

Figure 15:
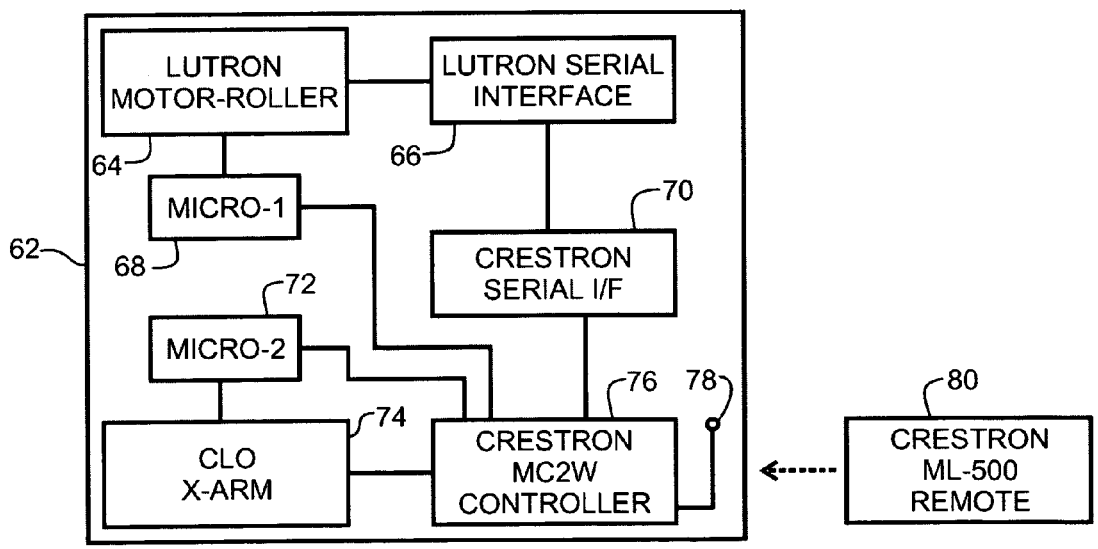
FIG. 15 is a functional block diagram of a flat panel display concealment and viewing apparatus according to an illustrative embodiment of the present invention.

Reference is directed to FIG. 15, which is a functional block diagram of a flat panel display concealment and viewing apparatus 62 according to an illustrative embodiment of the present invention. The illustrative embodiment illustrates a configuration of the present invention is based on commercially available components. The motorized roller 64 is a Lutron Sivoia QED series roller, model "EDU 64", which is available from Lutron Electronics Company, Inc., Cooperstown, Pa. The display support 74 is a CLO X-Arm robotic arm, which is available from CLO Systems, L.L.C., West Covina, Calif. The programmable controller 76 is a Crestron model MC2W control system with integrated RF gateway, which is available from Crestron Electronics, Inc., Rockleigh, N.J. In another illustrative embodiment, an "NI Series" programmable controller available from AMX Corporation of Richardson Tex. is employed. Communications between the CLO X-Arm 74 and the Crestron, or other, controller 76 is accomplished using and cable and a pair of RS-232 serial communication ports, which are incorporated into the respective devices. Communication between the Lutron motor roller 64 and the Crestron controller 76 is accomplished using cables, a Lutron serial interface 66, and a serial interface port 70 on the controller 76, which provides bi-directional serial communications between the devices. The interlock switches 68, 72, are SPST "Micro" switches of suitable configuration for mounting and engagement as described hereinbefore. Remote operation of the controller 76 is accomplished using a Crestron model "ML-500" RF remote controller 80 that communicates with an antenna 78 that is coupled to the controller 76. The functional operation of the controller 76 is achieved through custom programming using the native programming language of the Crestron controller 76.

Figure 16:
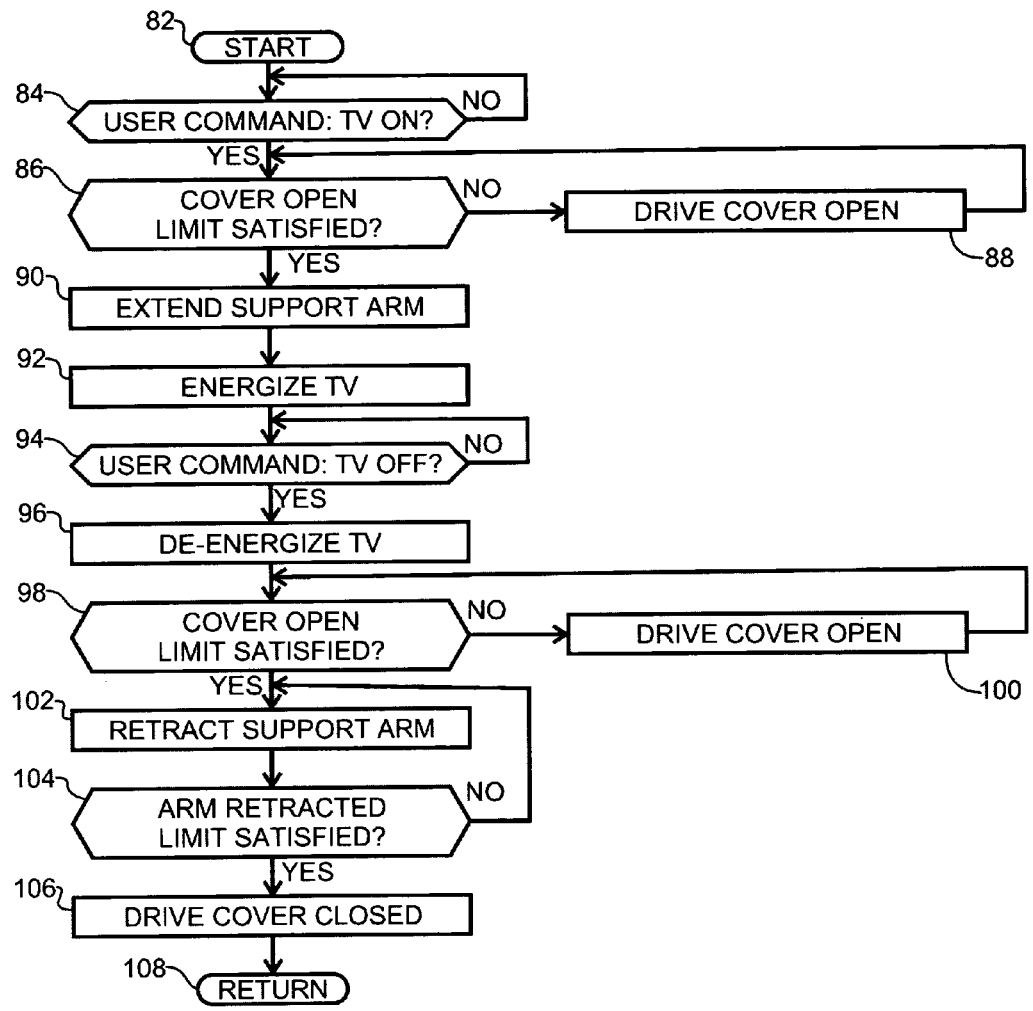
FIG. 16 is a process flow diagram for a flat panel display concealment and viewing apparatus according to an illustrative embodiment of the present invention.

Reference is directed to FIG. 16, which is a process flow diagram for a flat panel display concealment and viewing apparatus according to an illustrative embodiment of the present invention. FIG. 16 illustrates the generalized operation of the illustrative embodiment apparatus. The process begins at step 82 and proceeds to step 84, which is a test to determine if the user has turned the flat panel display ("TV") on. If the user has turned the TV on, then flow proceeds to step 86, which is a test to determine whether the cover open limit has been satisfied, such as a contact actuation of a switch. If the limit is not satisfied, then the cover must be driven open at step 88, to provide clearance for the extension of the display support. After the cover is driven open, the test at step 86 is made again to verify the drive operation. If the test at step 86 is satisfied, then flow proceeds to step 90 where the display support arm is extended. At step 92, the TV is energized, thus completing the user's desired command.

Continuing in FIG. 16, step 94 is a test to determine whether the user has commanded that the TV is to be turned off, and the display retracted and concealed. If such a command is received, then flow proceeds to step 96 where the TV is turned off. Next, at step 98, a test to determine that the cover is still open is conducted. If the cover is not open, then the cover is driven open at step 100, and the condition is retested at step 98. Once the cover open test at step 98 is satisfied, then flow proceeds to step 102 where the display support is retracted. Step 104 is a test to determine whether the arm retracted limit condition has been satisfied. If not, then flow returns to step 102 to continue the retraction process. Once the arm is retracted at step 104, then flow proceeds to step 106 where the display over is driven closed. The process returns at step 108.

Figure 17:
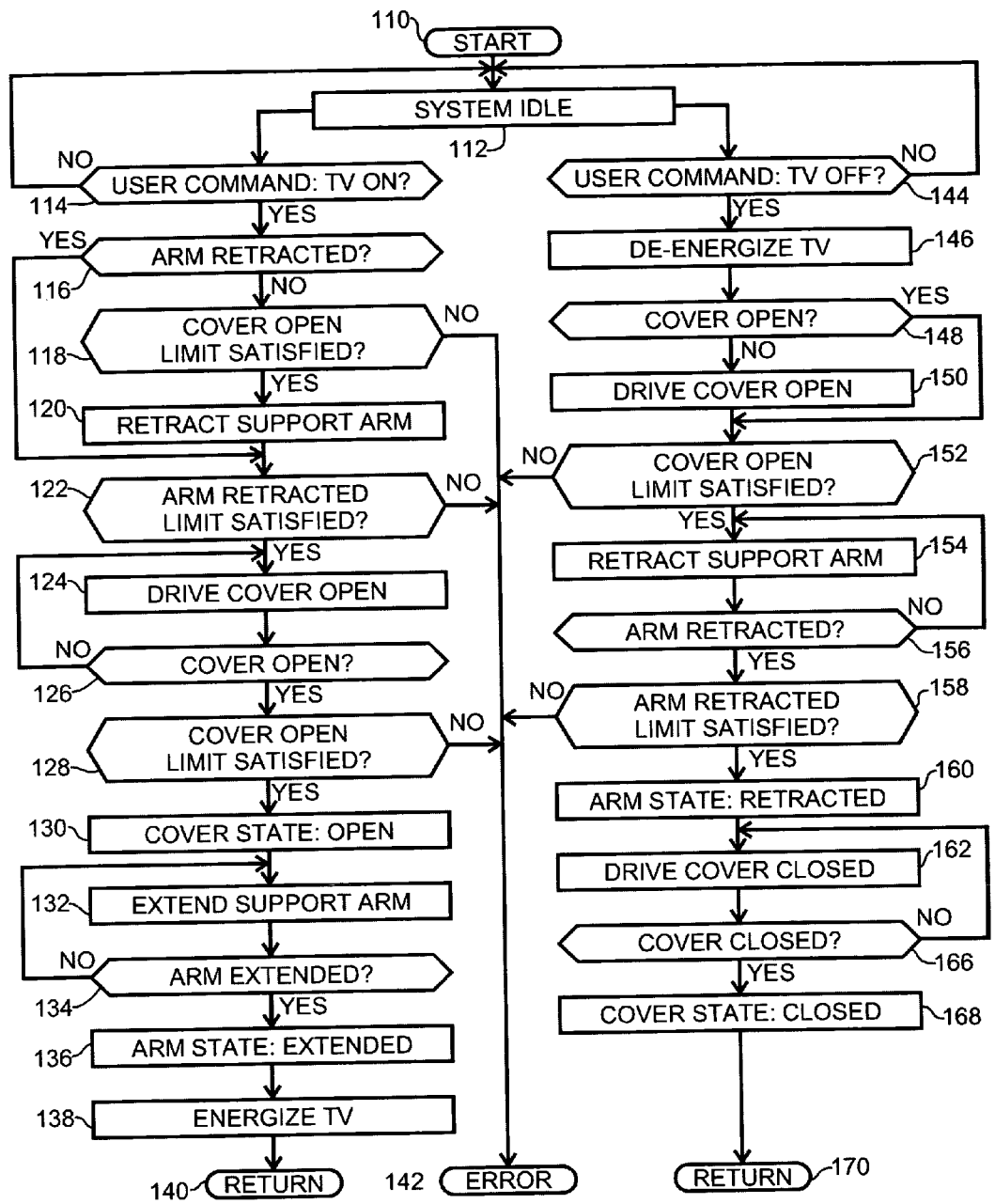
FIG. 17 is a process flow diagram for a flat panel display concealment and viewing apparatus according to an illustrative embodiment of the present invention.

Reference is directed to FIG. 17, which is a process flow diagram for a flat panel display concealment and viewing apparatus according to an illustrative embodiment of the present invention. FIG. 17 illustrates a process that includes both physical limit switch and software confirmation of the movement and position of the display support and display cover. This embodiment is pertinent to the structures articulated with respect to FIG. 14 and FIG. 15, as well as other embodiments. The process starts at step 110 and proceeds to step 112 where the system is in an idle condition, and awaiting a user command. There are essentially two commands and two corresponding processing sequences. The first is turning the TV on at step 114, and the second is turning the TV off at step 144.

The TV-ON sequence of FIG. 17 begins at step 114 where the user command to do so is received by the system. At step 116, a software test is made to determine that the display support arm is retracted. If it is, then flow continues to step 122 where the physical limit switch is checked, which will be discussed hereinafter. If the software test at step 116 indicates that the arm is not retracted, then flow proceeds to step 118 for a physical test that the cover open limit is satisfied. If not, an error condition is reported at step 142 because the combination of the arm not being retracted and the cover not open indicates that a collision may have occurred. If the cover is open at step 118, then flow proceeds to step 120 where the arm is retracted. Flow then proceeds to step 122 to test the physical limit for the arm being retracted. If it has not, then an error condition is reported at step 142, indicating that it is not possible, for some unknown reason, to retract the arm. Once it has been confirmed that the arm has physically been retracted at step 122, then flow proceeds to step 124.

Since it was confirmed that the arm is retracted at step 122, then it is safe to drive the cover open at step 124. Step 126 is a software determination that the cover opening process has been completed. Once completed, a physical test for the cover open condition is conducted at step 128. If the limit test at step 128 is not satisfied, then an error condition is returned at step 142, indicating that the cover cannot be fully opened. On the other hand, it if the cover limit test is met at step 128, then the software cover state is set to "open" at step 130 and the display support arm is driven to the extended position at step 132. Step 134 is a software determination that the arm is extended. If it is not, then the extension process continues at step 132. Once extended at step 134, flow continues to step 136 where the software state for the arm being extended is set. The TV is energized at step 138, which completes the fully interlocked operation requested by the user at step 114. Flow returns to the idle state from step 140.

The power off command sequence of FIG. 17 begins at step 144 where the user enters such a command from the idle state of step 112. Once the power off command is received at step 144, flow proceeds to step 146 where the TV is immediately turned off. At step 148 a software test is made to determine that the cover is open, which is required before the arm can be retracted. If the cover is open, then flow proceeds to step 152. IF the cover is not open at step 148, then it is driven to the open state at step 150, and then flow proceeds to step 52. Step 152 is a physical test by the limit switch that the cover is fully open and in the revealed condition. If it is not, an error condition is returned at step 142, indicating that it is not possible to fully open the cover. If the cover is confirmed to be open at step 152, then the arm is retracted at step 154. Step 156 is a software test to determine that the arm retraction is complete. Once this test is satisfied, flow proceeds to step 158, which is the physical test that the arm is retracted. If the physical test fails at step 158, an error condition is returned at step 142, indicating that it is not possible to retract the arm. If the retraction test is satisfied at step 158, then flow proceeds to step 160 where the retracted state is set in software. Since the arm has been confirmed to be fully retracted, it is safe to close the cover, which occurs at step 162. Step 166 is a software confirmation of the cover closure process, and once this is complete, it is updated as closed at step 168. The process returns to the idle state at step 170.

Figure 18:
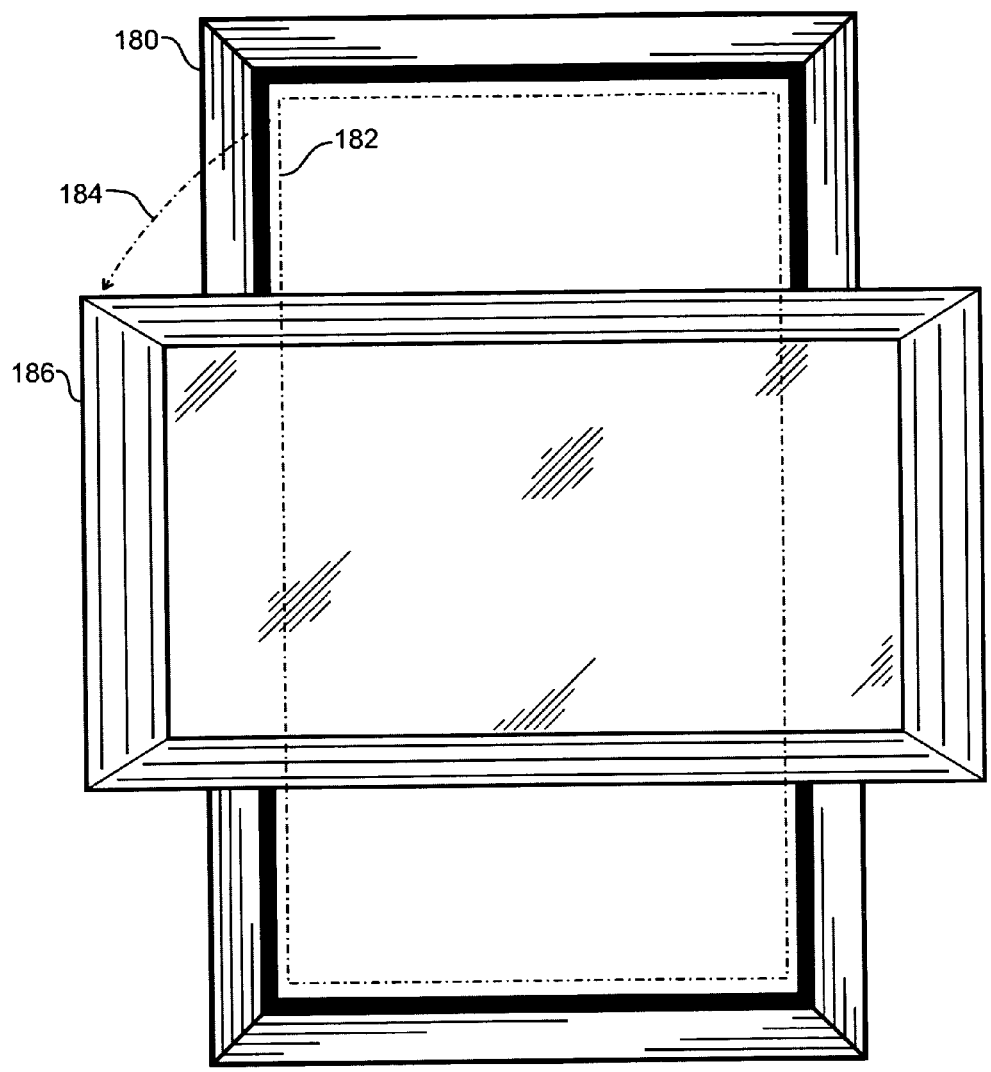
FIG. 18 is a front view drawing of a flat panel display concealment and viewing apparatus showing the cover open to reveal the flat panel display that has been rotated from portrait to landscape orientation for viewing according to an illustrative embodiment of the present invention.

Reference is directed to FIG. 18, which is a front view drawing of a flat panel display concealment and viewing apparatus showing the cover open to reveal the flat panel display that has been rotated from portrait to landscape orientation for viewing according to an illustrative embodiment of the present invention. In this embodiment, the user is enabled to mount the housing and frame 180 in the portrait orientation. The display mount (not shown) is enabled to extend the display from a portrait orientation 182 outwardly from the housing 180. Then rotate 184 the display to a landscape orientation 186 for optimum viewing.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for concealing a flat panel display, and for supporting and extending the display to a viewing position, the apparatus comprising:
   a display cover operable between a concealed position and a revealed position;
   a display support operable between a retracted position and an extended position, and
   a display support interlock coupled to disable operation of said display support when said display cover moves away from said revealed position.

2. The apparatus of claim 1, further comprising:
a display cover interlock coupled to disable operation of said display cover when said display support moves away from said retracted position.

3. The apparatus of claim 2 wherein said display support interlock is a switch that is actuated by said display cover when said revealed position is reached, and wherein
said display cover interlock is a switch that is actuated by said display support when said retracted position is reached.

4. The apparatus of claim 3 wherein said display cover includes a first control interface and said display support includes a second control interface, the apparatus further comprising:
a controller coupled to said first control interface and said second control interface, and coupled to said display support interlock and said display cover interlock, and wherein
said controller is operable to drive said display cover between said revealed position and said concealed position, and operable to drive said display support between said retracted position and said extended position, and operable to interlock the operation of said display cover and said display support in response to actuation of said first interlock switch and said second interlock switch actuations.

5. The apparatus of claim 4, further comprising:
a remote controller wirelessly communicative with said controller for enabling operation thereof.

6. The apparatus of claim 1 wherein said display cover is a flexible sheet that is furled and unfurled from a roller to facilitate the transition between said concealed position and said revealed position.

7. The apparatus of claim 6 wherein said flexible sheet is fabric having a decorative surface that is exposed when in said concealed position.

8. The apparatus of claim 1 wherein said display cover is motor driven between said concealed position and said revealed position.

9. The apparatus of claim 1, further comprising:
a housing disposed about said display support, and having a display opening formed therein, and wherein
said display cover substantially covers said display opening when at said concealed position, and wherein
said display support extends the display through said display opening when at said extended position.

10. The apparatus of claim 9, further comprising:
a decorative frame disposed about said display opening.

11. The apparatus of claim 1 wherein said display support extends outwardly from a vertical mounting surface.

12. The apparatus of claim 11 wherein said mounting surface is a wall.

13. The apparatus of claim 11 wherein said display support tilts and swivels at said extended position, thereby enabling optimization of the display position for viewing.

14. The apparatus of claim 11 wherein said display support rotates the display through ninety degrees at said extended position between a portrait orientation and a landscape orientation.

15. The apparatus of claim 1 wherein said display support is a robotic arm.

16. A method of concealing a flat panel display with a display cover, drivable between a concealed position and a revealed position, and for supporting the display with a display support that is extendable from a retracted position to an extended position for viewing, the method comprising the steps of:

interlocking against operation of the display support if the display cover is away from the revealed position;
driving the display cover to the revealed position;
enabling operation of the display support when the display cover reaches the revealed position, and
extending the display support.

17. The method of claim 16, further comprising the steps of:
interlocking against operation of the display cover when the display support moves away from the retracted position;
retracting the display support;
enabling operation of the display cover when the display support reaches the retracted position, and
driving the display cover to the concealed position.

18. The method of claim 16 wherein said display cover is a flexible sheet wrapped about a roller, further comprising the steps of:
unfurling the sheet from the roller to position the display cover in the concealed position, and
furling the sheet onto the roller to position the display cover in the revealed position.

19. The method of claim 16 wherein said display cover is motor driven, and further comprising the step of:
driving the display cover to the revealed position using the motor.

20. The method of claim 16 wherein the display cover and the display support are coupled to a controller, and wherein the controller is coupled to a display support interlock switch that is actuated by the display cover when the revealed position is reached, and coupled to a display cover interlock switch that is actuated by the display support when the retracted position is reached, the method further comprising the steps of:
driving the display cover, by the controller, between the revealed position and the concealed position;
driving the display support, by the controller, between the retracted position and said extended position;
interlocking the operation of the display cover and the display support in response to actuation of the display cover interlock switch and the display support interlock switch.

21. The method of claim 20, further comprising the step of:
remotely controlling the controller using a wirelessly communicative remote control.

22. The method of claim 16, further comprising the step of:
extending the display support outwardly from a vertical mounting surface.

23. The method of claim 22, further comprising the steps of:
tilting the display by the display support at the extended position, and
swiveling the display by the display support at the extended position, thereby optimizing the display position for viewing.

24. The method of claim 22, further comprising the step of:
rotating the display through ninety degrees by the display support at the extended position between a portrait orientation and a landscape orientation.

* * * * *